June 28, 1960 F. P. GOOCH 2,942,494
CENTRIFUGE DRIVE
Filed Nov. 26, 1958 3 Sheets-Sheet 3

*INVENTOR.*
FRED P. GOOCH
BY Hugo G. Jemman
ATTORNEY

# United States Patent Office 2,942,494
Patented June 28, 1960

2,942,494

CENTRIFUGE DRIVE

Fred P. Gooch, Media, Pa., assignor to The Sharples Corporation, a corporation of Delaware Filed Nov. 26, 1958, Ser. No. 776,510

10 Claims. (Cl. 74—573)

This invention pertains to mechanisms for supporting and driving centrifuge rotors, and more particularly to supporting and driving mechanisms in which flexibility is provided to compensate for unbalance in the rotor when operated at high speed.

It is common practice to carefully balance systems rotating at high speeds such as electric motors, steam turbines, and gyroscopes to avoid vibration and stresses in the bearings in which such systems rotate, and such systems commonly remain in balance in use.

The rotors of centrifuges, on the other hand, no matter how well balanced during manufacture, do not as a general rule remain in balance in use. Such rotors frequently are made of many parts which must be disassembled from time to time for cleaning purposes, and slight changes in relative position of the parts on reassembly result in unbalance. Moreover, in many types of uses, solids deposit on the inner periphery of the rotor, which deposits frequently become uneven with resulting unbalance.

Conventionally, to allow for this unbalance, the spindle on which a centrifugal rotor is mounted rotates in bearings at least one of which is flexibly supported, as for instance in springs or in resilient material, e.g. rubber, disposed between the outer race of the bearing and the frame. With such a flexible support, a centrifugal rotor which has become unbalanced in operation has a certain freedom to rotate about an axis through its center of mass, depending upon the degree of unbalance, as a result of which the rotor and its spindle rotate eccentrically. The inner race of the bearing rotates eccentrically along with the rotor and spindle, and the flexibly supported outer race of the bearing moves in a circular orbit as it follows the eccentric rotation of the rotor and spindle. As a result of this orbital motion of the outer race, the springs or resilient material comprising the flexible support for the outer race are subjected to alternate compression and expansion (relaxation of compression) at a very high rate, there being one cycle of compression and expansion for each revolution of the spindle on which the rotor is mounted. Centrifuges of this type commonly rotate at from 6000 to 10,000 revolutions per minute, and such rapid alternations of compression and expansion result in fatigue of the materials comprising the flexible support, and in a comparatively short life for the flexible support in the case of any excessive unbalance.

A flexible support for a bearing is illustrated in Figure 2 of U.S. Patent 2,321,144. In this illustration the centrifuge rotor is mounted on a spindle which in turn is mounted for rotation in anti-friction bearings, the upper of which is flexibly supported. The flexible support of the upper bearing is accomplished by mounting the periphery of the non-rotating outer race in a resilient ring which in turn is mounted on the frame. The rotating inner race is secured to the spindle. A rotor of this type is customarily balanced by the selective addition of weights, or the selective filing away of some of the material from the enlarged portion at either end of the main body of the rotor, so that an axis through the center of mass of the rotor is coincident with the geometrical axis of the spindle. When the rotor is so balanced, the spindle will rotate smoothly about its geometrical axis, and there is no tendency to compress or expand the various parts of the resilient ring around the upper bearing.

In the use of the centrifuge of said patent for the clarification, for example, of lubricating oils, solids sediment out of the oil passing through the centrifuge rotor, and deposit on the inner wall of the main body of the rotor. If, as not infrequently occurs, more solids are deposited on one side of the rotor than on the other side, the center of mass of the rotor is shifted from the geometrical axis of the rotor toward the side on which the greater amount of dirt has been deposited. The rotor now rotates about an axis through a new center of mass, and consequently the rotor, the spindle and the inner race of the upper anti-friction bearing all rotate eccentrically. As a consequence of this eccentric motion of the inner race of the upper anti-friction bearing, the outer non-rotating race thereof moves in a circular orbit within the resilient ring which also is non-rotating.

Flexible bearing supports of the kind described must of necessary be relatively stiff, not only to avoid unmanageable vibration when passing through the critical speed or speeds, e.g. during acceleration in bringing the rotor up to speed, or during deceleration when stopping the rotation, but also to avoid undue canting of the bearing in the stationary frame during the eccentric rotation of the rotor, the spindle and the inner race of the bearing.

The unavoidable stiffness of such supports restricts to an undesirable degree, in the case of unbalance, particularly when the rotor is relatively large, the extent to which the axis of rotation of the rotor may shift away from its geometrical axis in seeking to rotate about an axis through the new center of mass resulting from the uneven deposits of solids responsible for the unbalance. Moreover, in such constructions sufficient rigidity must be imparted to the spindle for driving purposes, thus affording very little, if any, opportunity of providing flexibility through the medium of the spindle.

In accordance with this invention, rigidity for driving purposes and flexibility to compensate for unbalance are provided by separate entities in a unitary structure, whereby any desired rigidity for driving purposes is afforded along with any desired degree of flexibility for rotation of the rotor about an axis through its center of mass during unbalance. The relatively high degree of flexibility afforded by the invention permits the rotor to rotate about an axis through the center of mass even in the case of a relatively high degree of unbalance, and this highly desirable result is accomplished without sacrifice of rigidity for driving purposes.

The flexibility provided by the invention permits the rotating mass to rotate about an axis through its center of mass during unbalance, without undue stresses on the bearing adjacent the rotor, to which stresses the said bearing is subjected when flexibility is relatively highly restricted, e.g. by the stiffness of springs or resilient rings as in the case above more particularly described. Moreover, the invention embodies the above features without accompanying canting of the above-mentioned bearing during unbalance.

Further features of the invention will become apparent to persons skilled in the art as the description proceeds in connection with the accompanying drawings in which.

Figure 1:
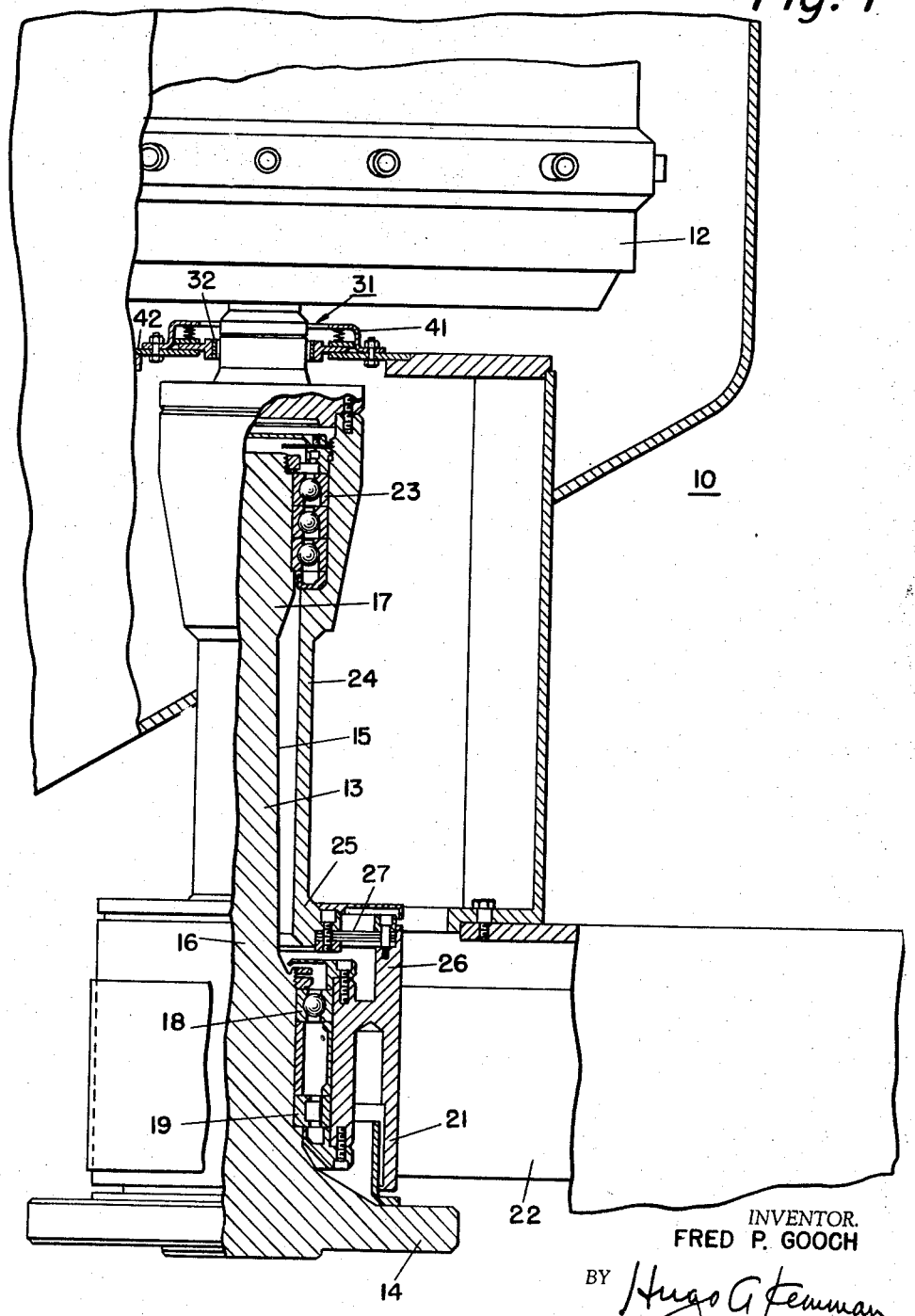
Figure 1 is an elevation, shown broken and partly in section, illustrating an embodiment of the invention.
Figure 2:
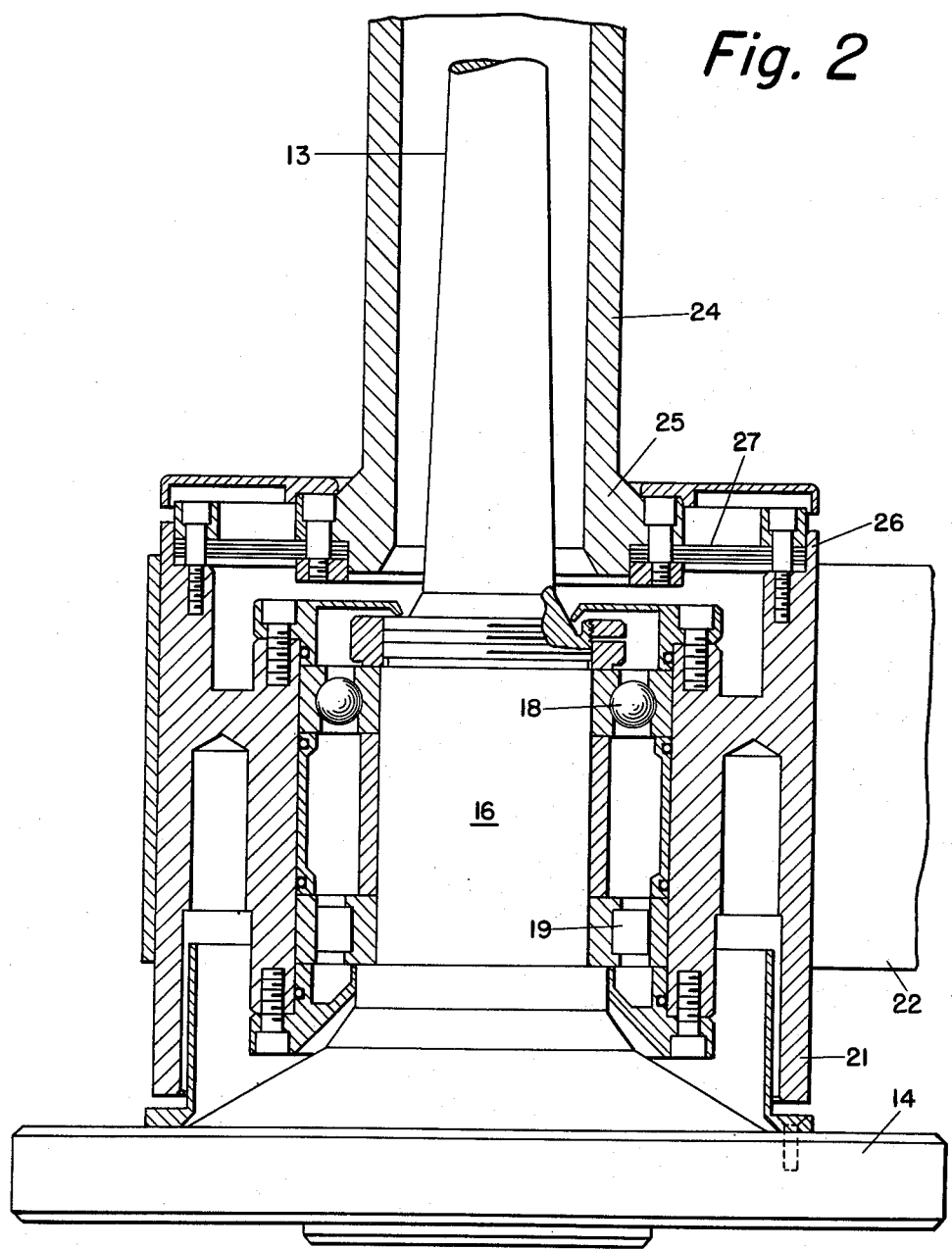
Figure 2 is an elevation, shown broken and largely in section, of the lower portion of the embodiment of Figure 1.
Figure 3:
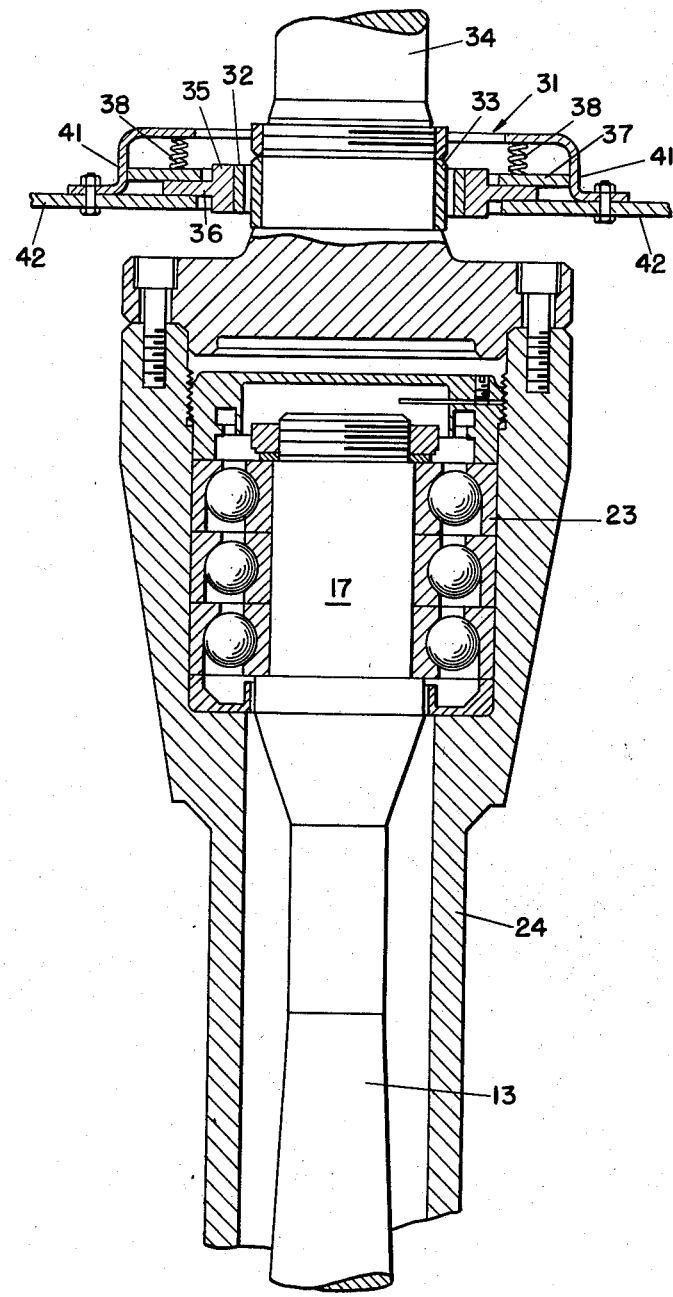
Figure 3 is an elevation, shown broken and largely in section, of the upper portion of the embodiment of Figure 1.

Referring now more particularly to the drawings, at 10 is illustrated a centrifuge having a frame, shown partly cut away, and a rotor 12, also shown partly cut away.

At 13 is shown a stationary center post or shaft having a base 14, and a center portion 15 of lesser diameter than end portions 16 and 17, end portion 16 being shown adjacent to base 14.

Mounted about end portion 16, as by spaced bearings 18 and 19, is drive pulley 21, illustrated as being driven by belt 22 leading from a source of power, not shown.

Mounted on, and around end portion 17, and supported by post 13, as by thrust bearings 23, is tubular spindle 24 which extends downwardly about center portion 15. Lower end 25 of spindle 24 is connected to upper end 26 of drive pulley 21 by a plurality of superimposed laterally extending thin metal annuli 27. Annuli 27 preferably are both flexible and resilient. Annuli 27 provide a flexible driving connection between pulley 21 and spindle 24, the axis of rotation of pulley 21 being fixed by virtue of its mounting on post portion 16, and the axis of rotation of spindle 24 being movable in a manner to be hereinafter more particularly described.

Spindle 24 which is rigid in construction extends upwardly above bearings 23, rotor 12 being mounted on its upper end.

As illustrated, a drag 31 which may be of any conventional design and construction known in the centrifuge art, or otherwise, surrounds spindle 24 above bearings 23 but below rotor 12, drag 31 being mounted on the frame in any desired manner, such as illustrated.

As shown, drag 31 is constructed as follows. A bushing or annular ring 32 fits rather loosely about collar 33 which is secured to upper portion 34 of spindle 24. Bushing 32 is supported by annular ring 35 of T-shaped cross section to which bushing 32 is secured by any suitable means, e.g. by screws or welding. Annular leg 36 of ring 35 rests on frame members 42 and is engaged by annular ring 37 which is held in contact with annular leg 36 by any suitable means, such as circumferentially spaced springs 38, compressed against ring 37 by annular member 41 secured to frame members 42.

The operation of the invention is as follows:

Power is supplied to driving element or pulley 21 by means of belt 22 connected to any suitable prime mover such as an electric motor. By virtue of annuli 27, spindle 24 is driven by pulley 21, and rotor 12 is brought up to speed by virtue of its being attached to the top 34 of spindle 24.

As long as rotor 12 remains in balance, rotor 12 and spindle 24 rotate about their respective geometrical axes, such axes being coincident.

In the case of unbalance, on the other hand, the requirements of which for satisfactory operation are that rotor 12 shall rotate about an axis through its center of mass, the flexibility and resiliency inherent in intermediate portion 15 of post 13 come into play.

From the foregoing description, it will be noted that ends 16 and 17 of spindle 13 possess greater rigidity than central portion 15, from which it follows that central portion 15 possesses greater flexibility. Flexing, therefore, is virtually entirely confined to central portion 15, and such flexing, in response to the forces generated by the unbalance, is such as to cause end 17 of post 13 to move in the required circular orbit, i.e. the orbit end 17 must follow in order for rotor 12 and its contents to rotate about an axis passing through the center of mass of the two, the diameter of the circular orbit, other factors remaining the same, depending upon the degree of unbalance. The inner races of bearings 23, being secured to end 17 of post 13, acquire the same orbital motion as end 17. On the other hand, rotor 12, the top of spindle 24, and the outer races of bearings 23 which are secured to spindle 24 rotate eccentrically.

Lower end 25 of spindle 24 rotates without orbital motion by virtue of the fact that lower end 25 is secured radially by annuli 27.

Annuli 27, by virtue of their flexibility and resiliency, permit the eccentric rotation of upper end 34 of spindle 24 while at the same time transmitting power to spindle 24 from pulley 21. This is accomplished without the continual or repeated flexing of annuli 27 such as takes place in the case of the prior art devices discussed above.

The use of a drag, such as illustrated at 31, is not an essential, but is frequently preferred to absorb energy of vibration from the rotating mass when passing through its critical speed or speeds, which is a well-known function of mechanisms of this type. Since the function and operation of a drag are so well known in the art, a detailed description thereof, in the interest of brevity, will not be made.

Post 13 may be manufactured from any desired material possessing flexible and resilient properties, such as the various steels, including the alloy steels. The same applies to the annuli 27, any number of which may be employed, such as one or more. Annuli 27 are preferably thin to provide a high degree of flexure, such as between $\frac{1}{64}$ and $\frac{1}{16}''$, and are preferably resilient so as to return readily to their original shapes. The number of annuli employed is in large part dictated by the torque transmitted therethrough from pulley 21 to spindle 24, spindle 24 being supported on top 17 of post 13. Spindle 24 is preferably manufactured from high strength steel which term includes its alloys. The remaining parts may be manufactured from any suitable material, such as the various metals and alloys.

Another outstanding advantage of the invention resides in the fact that the various bearings may be completely enclosed, and thus segregated from foreign substances, such as dirt, dust, spilled liquid, and the like. Such isolation of the bearings also makes it possible to prevent the escape of lubricant from the bearings onto operative parts, such as pulley 21 and belt 22.

Although in the above description, post 13 has been more particularly described as being vertical, it is to be understood that such position is not essential, and that post 13 and associated parts may occupy any other position, such as horizontal, or inclined.

Also it is not essential that post 13 be manufactured in a single piece, as will be obvious, for either or both ends 16 and 17 may be attached to central portion 15 in any desired manner such as by screw threads. This lends a high degree of versatility to the invention making it possible to manufacture central portion 15 and end portions 16 and 17 of different materials in obtaining the desired rigidity in end portions 16 and 17, and the desired lesser rigidity along with the desired flexibility and resilience in central portion 15.

Moreover, various other modifications may be made. Thus while intermediate portion 15 of post 13 has been illustrated as being spaced radially inwardly of the spindle 24, it is to be understood that this is not an essential, for any other design or shape permitting relative rotational movement between portion 15 and spindle 24 with clearance sufficient to permit the abovementioned orbital motion of end 17 of spindle 13 may be substituted, these and other considerations of design including strengths of materials, etc., being well within the skill of the centrifugal engineer upon his becoming familiar herewith.

Therefore, it is to be understood that the above particular description is by way of illustration and not of limitation, and that changes, omissions, additions, substitutions and/or other modifications may be made without departing from the spirit of the invention. Accordingly, it is intended that the patent shall cover, by suitable expression in the claims, the various features of patentable novelty that reside in the invention.

I claim:

1. A drive comprising a post, said post having end portions of greater rigidity than a portion thereof between said end portions, a driving element mounted for rotation on one of said end portions, a hollow spindle positioned about said post and mounted for rotation on the other of said end portions, and a flexible coupling between said driving element and said spindle.

2. A centrifuge drive comprising a post, said post having end portions of greater rigidity than an intermediate portion of said post, a pulley mounted for rotation on one of said end portions, a hollow spindle positioned about said intermediate portion of said post and mounted for rotation on the other of said end portions, and a flexible annular coupling between said pulley and said spindle.

3. A centrifuge drive comprising a post, said post having enlarged portions at opposite ends thereof and a portion of relatively greater flexibility than said enlarged portions positioned intermediate said enlarged portions, a driving element mounted for rotation on one of said enlarged portions, a hollow spindle positioned about said post and mounted for rotation on the other of said enlarged portions, and a flexible coupling between said driving element and said spindle.

4. Apparatus comprising a post, said post having enlarged portions at opposite ends thereof and a portion of a relatively greater flexibility than said enlarged portions positioned intermediate said enlarged portions, a driving element mounted for rotation on one of said enlarged portions, a hollow spindle positioned about said post and mounted for rotation on the other of said enlarged portions, a flexible coupling between said driving element and said spindle, and a rotor mounted on said spindle.

5. Apparatus comprising a post, said post having ends of greater rigidity than the portion between said ends to provide said portion with relatively greater flexibility, a driving element mounted for rotation on one of said ends, a hollow spindle enclosing a part of said post and mounted for rotation on the other of said ends, a flexible coupling between said driving element and said spindle, said spindle having an end extending beyond said last-mentioned end of said post, and a rotor mounted on said last-mentioned end of said spindle.

6. The apparatus of claim 5 including a drag positioned about said spindle adjacent said rotor.

7. In a centrifuge drive in combination, a post, said post being comprised of a first rigid portion and a second rigid portion spaced from said first rigid portion and an intermediate portion of lesser rigidity than said first and second rigid portions, a driving element mounted for rotation on said first rigid portion, a spindle having a hollow part positioned about said post and being mounted for rotation on said second rigid portion, said driving element having a part spaced radially from said spindle, and a plurality of superimposed annuli connected to said spindle and to said driving element.

8. In a centrifuge drive in combination, a post, said post being comprised of a first rigid portion and a second rigid portion spaced from said first rigid portion and a resilient intermediate portion of greater flexibility than said first and second rigid portions, a driving element mounted for rotation on said first rigid portion, a rigid spindle having a hollow part positioned about said post and being mounted for rotation on said second rigid portion, said driving element having a part spaced radially from said spindle, and a plurality of superimposed flexible and resilient annuli connected to said spindle and to said driving element.

9. In a centrifuge in combination, a post, said post being comprised of a first rigid portion and a second rigid portion spaced from said first rigid portion and a resilient intermediate portion of greater flexibility than said first and second rigid portions, a driving element mounted for rotation on said first rigid portion, a rigid spindle having a hollow part positioned about said post and being mounted for rotation on said second rigid portion, said driving element having a part spaced radially from said spindle, a plurality of superimposed flexible and resilient annuli connected to said spindle and to said driving element, and a rotor mounted on said spindle.

10. In a centrifuge in combination, a post, said post being comprised of a first rigid portion and a second rigid portion spaced from said first rigid portion and a resilient intermediate portion of greater flexibility than said first and second rigid portions, a driving element mounted for rotation on said first rigid portion, a rigid spindle having a hollow part positioned about said post and being mounted for rotation on said second rigid portion, said driving element having a part spaced radially from said spindle, a plurality of superimposed flexible and resilient annuli connected to said spindle and to said driving element, a rotor mounted on said spindle, and a drag about said spindle positioned between said post and said rotor.

References Cited in the file of this patent
UNITED STATES PATENTS

| | | |
|---|---|---|
| 1,311,509 | Hebrard | July 29, 1919 |
| 2,219,875 | Roberts et al. | Oct. 29, 1940 |
| 2,220,524 | Kapitza | Nov. 5, 1940 |